Feb. 21, 1967    L. L. DAVIS ET AL    3,305,760
AUTOMATIC LINE AND BATTERY OPERATED POWER SUPPLY SYSTEM
Filed Jan. 16, 1963    2 Sheets-Sheet 1

LARRY L. DAVIS
ARTHUR H. IVERSEN
INVENTORS

BY Nilsson & Robbins
ATTORNEYS

LARRY L. DAVIS
ARTHUR H. IVERSEN
INVENTORS

United States Patent Office 3,305,760
Patented Feb. 21, 1967

3,305,760
AUTOMATIC LINE AND BATTERY OPERATED
POWER SUPPLY SYSTEM
Larry L. Davis, 4345 Manzanita Drive, San Jose, Calif. 95129, and Arthur H. Iversen, San Francisco, Calif. (519 Nimitz Ave., Redwood City, Calif. 94061)
Filed Jan. 16, 1963, Ser. No. 251,816
5 Claims. (Cl. 321—45)

This invention relates generally to an oscillator-converter and more particularly to a transistor network embodying a saturable core transformer which efficiently converts a direct current voltage into an alternating current voltage, or a desired different direct current voltage.

The present invention exhibits particularly useful application in power supplies for efficiently converting a low direct current voltage such as of the order of 10 volts from a battery to a high direct current voltage such as of the order of several thousands of volts; and several of the examples and their associated discussions presented herein relate to such applications. However, it is emphasized that the scope of the invention is not limited to such examples or combinations and is useful in any application where a reliable and highly efficient conversion from a low value of direct current voltage over a wide range of current loads is desired.

One example of a system wherein such a converter is highly desirable is a high voltage power supply for an ion vacuum pump for electron tubes and similar devices. Other examples include power supplies for the focusing and deflecting of electron beams particularly in portable or satellite television cameras or photomultipliers and in space telemetry and the like where the transmission duty cycle may be appreciably less than one.

It is often desirable in such examples to convert a low battery voltage to a high direct current voltage and the effective lifetime of a given battery depends directly upon the efficiency of the converter. In the prior art, such converters are generally of the character which require a minimum driving power under maximum loading conditions. The required driving power, such as the base drive of the transistors in a conventional converter, typically is set for the required full load condition. Under these conditions the efficiency of power conversion out of the low voltage current source can be quite high. However, when a full load is not required, this driving power, which is an appreciable portion of the total drain on the battery, is much greater than necessary to sustain operation. Thus the efficiency at lower power levels is severly reduced, and the battery life is far shorter than would be indicated from the magnitude of power required by the load. In addition the power thusly wasted is usually manifest as undesired heat which must be dissipated from transformer windings, transistors, resistors, and the like.

In the field of high power electron tube manufacturing, testing, and systems use, it is frequently desirable or mandatory that an ion vacuum pump be utilized to evacuate the tube. In this connection ion pumps have in large measure replaced oil or mercury diffusion pumps. In some cases the ion pump is utilized only during the processing of the tube or in testing it; and in other cases the pump is an appendage pump permanently attached for continuously pumping the tube after it is installed in the system for which it was provided. Such appendage pumps are generally utilized in cases where extremely high power densities are encountered and there is a consequent continuous out-gassing of the tube. These high power densities are encountered in the class of tubes which include, for example, high power traveling-wave tubes; and high power klystrons. The cost of such tubes is frequently of the order of tens of thousands of dollars each.

In the processing phases during manufacture of such tubes and in their subsequent operation, the cathode emission, upon which the satisfactory operation of the tube critically depends, is extremely sensitive to the existence of any gaseous products evolved. These gases have a varying contamination effect on the cathode emission depending upon the composition and quantity of the gases. It is the purpose of the ion pump to remove continuously these gases, thus preventing poisoning of the cathode and oxidation of the internal surfaces of the tube during processing and subsequent operation.

The processing of a high power tube generally includes a bakeout phase, an activation phase and a beam processing phase. The initial or bakeout phase involves raising the entire tube to an elevated temperature thusly to cause the structure to evolve adsorbed and much of the absorbed gases. During this phase large quantities of gas are evolved, and should there be a power or equipment failure at this stage with a consequent cessation of pumping, the gases will continue to evolve inside the tube and will rapidly reach a pressure level such that the complex internal circuit structure and cathode will oxidize, thereby damaging the entire structure and making it unusable for rebuilding.

The activation phase includes elevating the cathode temperature so as chemically to alter the surface thusly to enable it to emit electrons. Should there be a power or equipment failure during this phase with consequent cessation of pumping, the gases which are being evolved will rapidly oxidize the cathode, thereby rendering the tube inoperative, because the cathode will not become activated or enabled to emit.

During the beam processing stage electron beam power is drawn from the activated cathode further to outgas the tube. The amount of power drawn may vary from a fraction of the design power to full power or slightly beyond. During this operation the cathode, complex circuit, and collector, are heated in connection with and as a result of the beam power. A power or equipment failure with consequent cessation of pumping during this phase results in contamination or oxidation, or both, of the emitting surface of the cathode and oxidation of the heated circuit and collector surfaces.

In addition, ion pumps, upon being turned off, give off hydrocarbons. In the process of cooling, these hydrocarbon gases are diffused back into the tube and serve as a source of contamination for the cathode surface. This can occur at any time during the manufacture or operation of the tube when an ion pump is coupled thereto.

Cathode poisoning in all its aspects is a serious but extremely subtle problem. The available emission level is very sensitive to the temperature, partial pressure, and composition of any contaminating gases. Even if certain gases are deposited upon the cathode while it is cold, the cathode will become poisoned upon reheating. Generally even small amounts of contamination of the cathode cannot be tolerated because high power tubes must of economic necessity be designed and required to operate at their upper operating limits. A lowering of even five percent in the level of emission can be caused by nearly infinitesimal contamination and may cause the power output or the gain of the tube to fall to an intolerable level, thusly causing the tube to be rejected either in the factory or in the field, with the obvious consequent loss in money and down time.

In systems use, the tube is required to perform under all of a set of predetermined specified conditions. It is in such use that a power or equipment failure has a large probability of occurring and that the tube may become lost because the ion pump ceases to operate. In such event, there is not only the expense of replacement of the tube and the cost of down time, but, even more crucially, there may be the temporary loss of the overall system of which the tube may be a vital part.

Prior art attempts to provide a reliable power supply suitable for the operation of an ion vacuum pump have typically been directed toward providing either a direct current voltage supply operated from line voltage or a battery operated supply. The reliability of the former obviously depends upon the existence and continued availability of a line voltage. Furthermore, it is often desirable or necessary to make tests with the ion pump at a potential considerably above or below ground potential. With conventional power supplies, this requires an expensive and custom made isolation transformer, for reasonable voltages, and is impractical for extremely high voltages which are frequently desirable for the ion pump. In the event of power or equipment failure, a battery operated supply can be substituted for the line voltage operated unit. However, the tube may be lost or destroyed in the time required to obtain and attach the replacement unit. Furthermore, the disadvantages of battery operated supplies generally are that the batteries must be constantly replaced as they reach the end of their useful life; and the battery life, in prior art systems, is shortened because of the inefficient conversion of the battery voltage to the required voltage.

It is therefore an object of the present invention to provide a converter for low direct current voltages, which is highly efficient over a wide range of output power.

It is another object to provide a high voltage direct current power supply which is extremely reliable over thousands of hours' unattended use.

It is another object to provide a versatile high voltage supply which may automatically begin operation from a small battery when a line voltage failure occurs and continue so to operate until the line voltage is again available.

It is another object to provide such a supply which automatically maintains a full charge in the battery until the battery operation is required.

It is another object to provide such a supply which is lightweight, small and low in cost.

It is another object to provide such a supply which may be coupled to the ion pump of a tube during shipment, storage, or during other instances when standard line voltage is not practically available.

It is another object to provide such an ion pump supply which may be utilized as a floating supply at an arbitrary voltage above or below ground potential.

Briefly, in accordance with one aspect of the present invention, these and other objects are achieved by providing a converter circuit which includes two switching transistors, a control transistor, and a low loss square hysteresis loop core, switching transformer. The output electrodes of the switching transistors are coupled to opposite terminals of the transformer primary, the center tap of which is coupled to a low direct current voltage source. The input electrodes are connected together and may be returned to ground.

The control electrodes of the switching transistors are, in a similar manner, coupled to the opposite terminals of a driving winding of the transformer, the center tap of which is returned to a bias potential source and is coupled to the output electrode of the control transistor.

The output winding of the transformer is connected to the load; and a signal proportional to the current drawn by the load is developed in the output circuit. This loading signal is coupled to the control electrode of the control transistor which, through its connection to the driving winding of the switching transformer, controls the average bias on the control electrodes of the switching transistors. The control transistor is thus a gate, controlled by the load, between the input electrodes of the switching transistor and the center tap of the transformer driving winding.

The gate or control transistor is biased to conduct the minimum current required to sustain operation of the converter under a no-load condition. Then, as the loading signal increases in magnitude due to increased power being drawn by the load, the control transistor provides more driving current to the switching transistors. Thus the drive of the switching transistors is increased or decreased as needed by the current drawn through the output circuit of the converter and does not permit unnecessary quantities of current to be passed through the switching transistors and thereby cause the wasting of converter driving power. Converter efficiencies of approximately 85% over a wide range of output loading are readily achieved by the present invention as compared with efficiencies dropping to approximately 10% at the lower end of the same loading range with conventional converters.

In an example of an embodiment of the invention including a power supply such as for an ion vacuum pump, the low voltage direct current supply is a combination comprising an alternating current line operated regulated supply and a rechargeable battery. Automatic circuit means are provided to supply the converter with driving power from the alternating current line, which also automatically maintains the battery at full charge. When the line voltage fails or is otherwise not available, the battery is automatically connected to the converter input for so long a period as the alternating current line voltage is unavailable. Then the battery is automatically uncoupled from the converter circuit and recharged.

A voltage multiplier network is provided in the output circuit of the converter for increasing the output voltage of the converter to a magnitude of the order of a few thousand volts direct current. Thus a high voltage is obtained while minimizing the $CV^2f$ losses in the transformer, which increase as the square of the turns ratio or voltage across the output winding. The multiplier thusly further increases the efficiency of the converter.

A meter circuit is provided in the combination for selectively permitting observation of the high voltage output to the ion pump, the current drawn by the pump, the pressure within the pump, and the condition of the battery.

Further details of these and other novel features and their principles of operation, as well as additional objects, and advantages of the invention, will become apparent and be best understood from a consideration of the following description taken in connection with the accompanying drawings which are presented by way of illustrative example only and in which.

Referring to the particular figures, it is stressed that the details shown are by way of example only and are presented in the cause of providing what is believed to be the most useful and readily understood description of the principles of the invention. The detailed showing is not to be taken as a limitation upon the scope of the invention which is defined by the appended claims forming a part of this specification.

Figure 1:
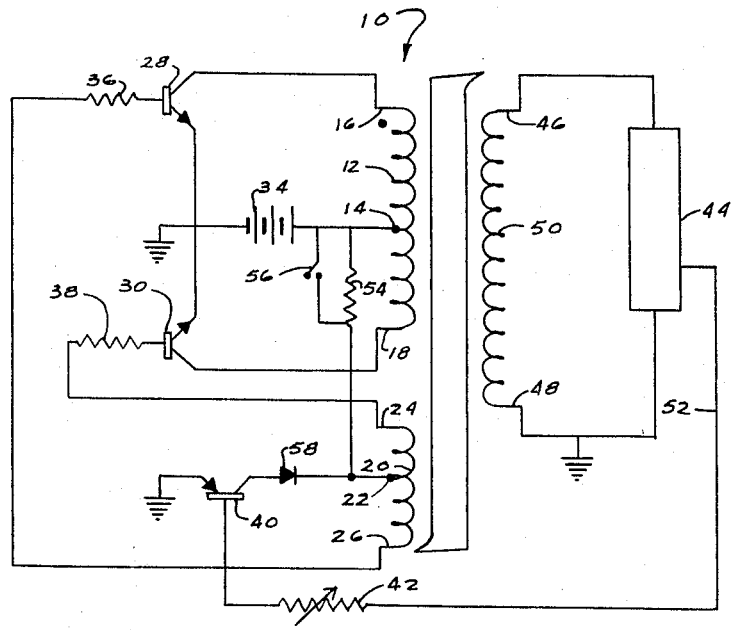
FIG. 1 is a schematic diagram of a high efficiency transistor converter circuit constructed in accordance with the principles of the present invention.

In FIG. 1 a saturable core transformer 10 having a square loop hysteresis characteristic associated with its core is illustrated. This switching transformer may be one of a high efficiency type manufactured by Pacific Instruments and which utilizes high permalloy, one mil, tape wound core material to minimize core losses. The transformer 10 includes a primary winding 12 having a center tap 14 and first and second terminals 16, 18, respectively. The switching transformer 10 includes a base driving winding 20 which is also center tapped with a center tap 22 and terminated with first and second terminals 24, 26, respectively.

The first and second switching transistors 28, 30, are coupled respectively between the first and second terminals 16, 18 and a common or, as shown, ground connection 32. In this example the emitter, input, electrodes are connected to ground and the collector, output, electrodes are coupled to the transformer winding terminals. A source of direct current potential 34 is shown connected between the ground terminal 32 and the center tap 14 with the negative terminal grounded.

The control or base electrodes of the switching transistors 28, 30 are each connected respectively to the first and second terminals 24, 26 of the base drive winding 20. Interposed between each of the base electrodes and the base driving winding 20 is a drive limiting resistor 36, 38 respectively. A control gate transistor 40, for controlling the base drive to the switching transistors is shown connected between the center tap 22 of the base drive winding 20 and ground. The control electrode of the gate transistor 40 is coupled through a variable resistor 42 to a load circuit 44 which is connected across the terminals 46, 48 of an output winding 50 of the switching transformer. A control signal, proportional or otherwise indicative of the amount of power being utilized by the output device, is generated as, for example, by a resistor, not shown, in series with the load device; and the control signal is impressed by a control signal lead 52 upon the base electrode of the transistor 40.

A biasing voltage for the switching transistors 28 and 30 is provided through a voltage dropping resistor 54 which is coupled between the center tap 22 of the base drive winding 20 and the center tap 14 of the winding 12. When desired, as for starting under load, for example, a higher voltage may be momentarily applied to the center tap 22 by shorting out a major portion of the resistor 54 by means of a momentary contact switch 56. The higher starting voltage thusly applied to the control electrode of the switching transistors through the base drive winding 20 may be isolated from ground and from the collector electrode of the gate transistor 40 by means of an isolating diode 58.

In operation, with the positive terminal of the battery 34 connected through the winding 12 to the collector electrodes of the two switching transistors 28, 30, any imbalance in the circuit will cause one of the transistors to begin to conduct a small amount of current. If, for example, the transistor 28 begins to conduct, regeneration will cause the terminal 18 of the winding 12 to become negatively polarized, causing the switching transistor 30 to be cut off. The terminal 16 of the winding 12 becomes even more highly positively polarized, causing the transistor 28 to conduct even more and to become quickly saturated. At the same time the high collector current in the transistor 28 causes the core of the transformer 10 to become saturated. As the core becomes saturated the collector current of the transistor 28 increases until it approaches the limit determined by the resistance in the collector circuit and the characteristics of the transistor. The regeneration process toward saturation is aided by the terminal 26 of the base drive winding 20 being driven negative by induction through the core of the transformer.

When however, the core becomes fully saturated, the induced voltage in the base driving winding becomes zero, due to no further change in flux or magnetization. The lack of voltage in the winding 20 and therefore lack of base drive current to the switching transistor 28 causes that transistor to become shut off and its collector current drops to zero. The rapid drop of collector current causes the polarity in all the windings of the transformer to reverse, thereby turning the switching transistor 30 on, and the regenerative process is repeated in the reverse direction.

The control signal circuit 52, 42 provides very high efficiency of the converter at low power levels. To set up properly the base drive of a conventional converter, the converter typically is loaded to full load condition; and the base drive is adjusted so that the collector current in the switching transistor is just great enough to saturate the transformer or to sustain operation. However, this causes the base drive at the lower power levels to be greatly in excess of what is needed to sustain operation and is normally an appreciable percentage of the total power drain from the battery 34.

In accordance with the present invention, on the other hand, the control transistor 40 is coupled as a gate between the node connection of the emitter electrodes of the switching transistors and the center tap 22 of the base drive winding 20. The negative control signal from the output circuit 44 then causes the control transistor 40 to conduct more and more base drive current as needed when the load requirements increase. The control transistor 40 then maintains a minimum sufficient base drive to the switching transistors for sustaining operation of the converter circuit at very high efficiency over the no-load to full load range of the converter.

The output circuit 44 may include a rectifying means and be a substantially direct current device, as in the example to be discussed below, in connection with FIG. 2. However, the output circuit 44 is, in some applications of the invention, an alternating current device. The converter circuit may in either case be readily adapted to provide, in accordance with the principles of the present invention, an extremely high efficiency of operation.

Figure 2:
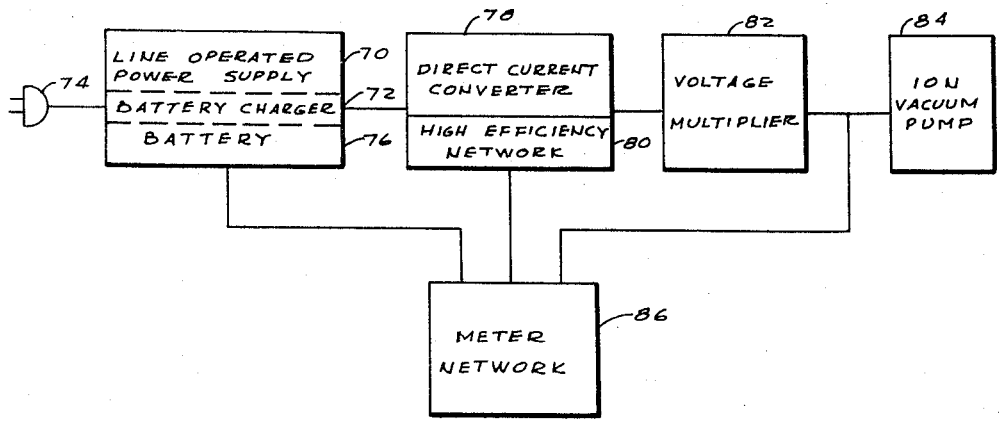
FIG. 2 is a block diagram of a high efficiency automatic power supply as may be utilized with an ion vacuum pump.

Referring to FIG. 2 the systems combination embodiment of the present invention is illustrated. In this example an automatic power supply for an ion vacuum pump is shown. A line operated power supply 70 and a battery charger 72 are illustrated as being connectable to a conventional alternating current line by means of an input lead 74. A battery 76 is provided which by means described below is automatically coupled to a direct current converter 78 whenever the line voltage does not exist in the input lead 74. At all other times the battery may be maintained at full charge through the operation of the battery charge 72 operated from the line 74.

Coupled to and associated with the direct current converter 78 is shown a high efficiency control network 80 which may be constructed along the lines of the control circuit described in connection with the discussion of FIG. 1. The direct current voltage output of the direct current converter 78 is impressed upon a voltage multiplier 82 so that, from a battery voltage of the order of 10 volts which is converted by the direct current converter 78 to a voltage of a few hundred volts and thence multiplied by a factor of approximately 10, a direct current voltage of the order of a few thousand volts may be supplied to an ion vacuum pump 84.

A meter network 86 may be selectively switched to observe the voltage of the battery 76, the high voltage output of the voltage multiplier 82 or the current drawn from the output of the multiplier by the load to indicate directly the degree of vacuum at any time in the ion vacuum pump 84.

Figure 3:
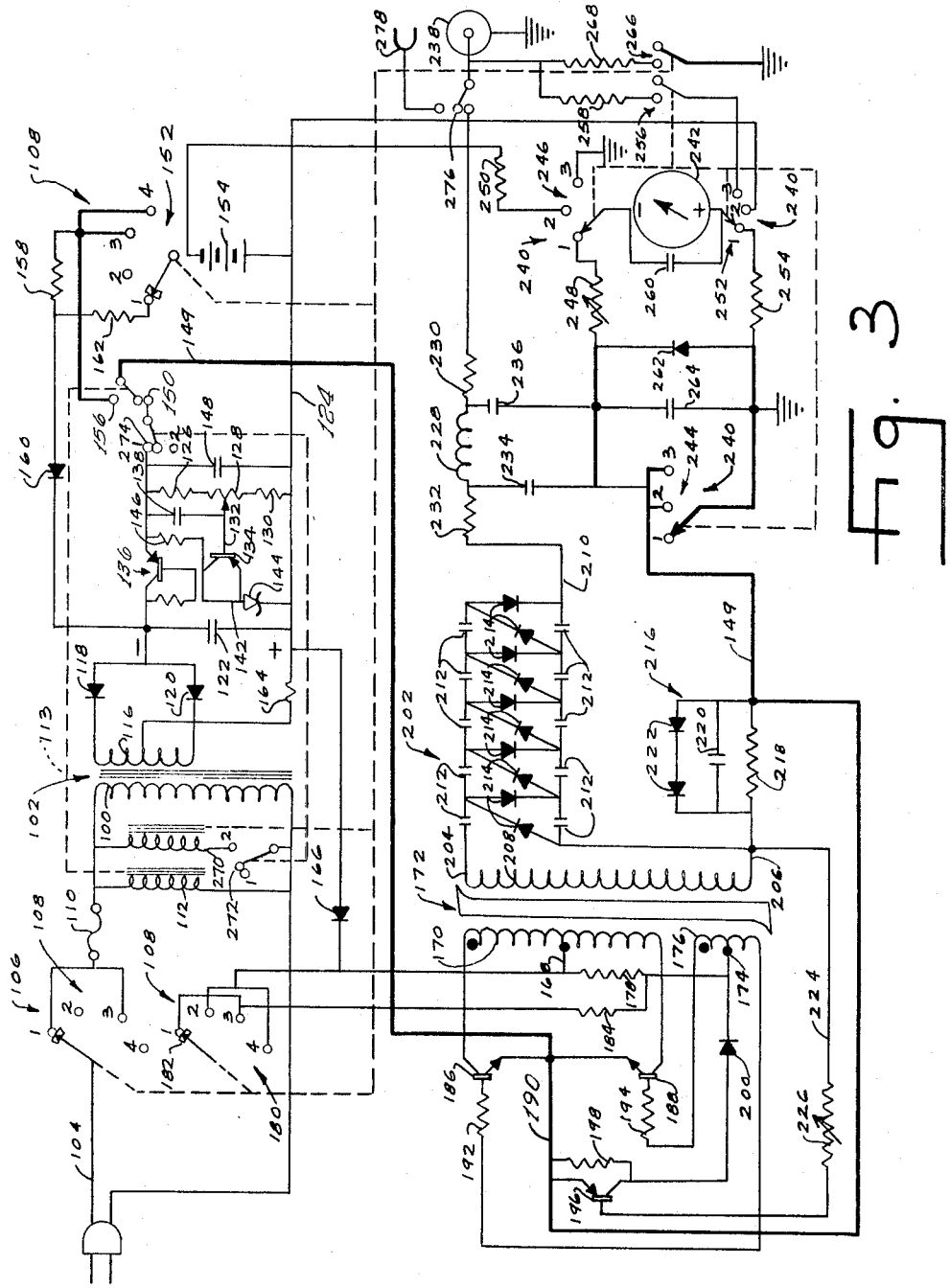
FIG. 3 is a schematic diagram of a typical example of the automatic power supply of FIG. 2.

In FIG. 3 a more detailed embodiment of the invention illustrated generally in FIG. 2 is disclosed. The primary winding 100 of a power transformer 102 may be energized from an alternating current line, not shown, through an input lead 104. A first wafer 106 of a multilayer selector switch 108 is intercoupled between one terminal of the primary winding 100 and one side of the input line 104. The switch terminals 1 and 3 of the first wafer 106 are connected in common and, through a fuse 110, are connected to the primary winding 100. Connected across the terminals of the winding 100 and therefore across the input line is a solenoid of a relay 112, the armature 114 of which, as shown by the dotted line 113, is actuated responsively to the existence of an energizing signal across the terminals of the input lines.

A secondary winding 116 is coupled to a full wave rectifier including a pair of diodes 118, 120, the anodes of which are coupled together to a filter capacitor 122. The other end of the capacitor 122 is connected to a common output bus 124.

The collector electrode of a regulating transistor 136 is connected to the common anodes of the rectifying diodes 118, 120. Connected between the emitter of the regulating transistor 136 and the bus 124 is a voltage divider network employing a resistor 126, a potentiometer 128, and a resistor 130 coupled in series. The movable terminal 132 of the potentiometer 128 is connected to the base electrode on a regulator control transistor 134. A capacitor 138 may be coupled between the emitter of the transistor 136 and the control electrode of the regulator control transistor 134; and a resistor 140 may be connected between the collector and the base electrodes of the regulating transistor 136. A voltage reference point 142 is maintained at the cathode of a voltage regulator diode 144 which is connected between the common output bus 124 and the emitter electrode of the regulating transistor 136. A resistor 146 is interposed between the regulator diode 144 and the emitter electrode of the transistor 136.

The regulator control transistor 134 is connected between the voltage reference point 142 and the control electrode of the transistor 136.

A filter capacitor 148 is connected between the emitter electrode of the transistor 136 and the output bus 124. During normal line operation the emitter electrode of the transistor 136 is connected to a circuit node 149 by the contacts 150 of the relay 112.

A second wafer 152 of the multilayer selector switch 108 is provided for connecting a rechargeable battery 154 into the output leads of the power supply. The switch contacts 3 and 4 of the second wafer 152 are connected together into a contact 156 of the relay 112 so that when the solenoid of the relay is not energized by the line voltage, the negative terminal of the battery 154 may be connected to ground and thereby placed in service. A trickle charge current limiting resistor 158 is connected between the switch positions 3 and 4, and the anodes of the rectifier diodes 118 and 120 through a charging diode 160. A full charging rate current limiting resistor 162 is connected between the first position of the switch wafer 152 and the anode of the charging diode 160. The movable contact of the switch wafer 152 is connected to the negative terminal of the battery 154. The positive terminal of the battery and the center tap of the secondary winding 116 of the transformer 102 is connected, through a small surge limiting resistor 164, to the output bus 124.

The output bus of the power supply is connected through a protecting diode 166 to the center tap 168 of the primary winding 170 of the saturable core switching transformer 172. The diode 166 protects the converter transistors, to be discussed below, in the event that the battery 154 is inadvertently "plugged in" with reversed polarity. A biasing voltage is supplied to the center tap 174 of the base drive winding 176 of the transformer 172 through a dropping resistor 178 which may be substantially shorted out when desired, as for starting, by the operation of a third wafer 180 of the selector switch 108. The movable contact 182 of the wafer 180 is, in this example of the invention, of the character momentarily to short between adjacent contacts when the armature of the switch is rotated. The switch positions 2 and 4 of the switch wafer 180 are connected together to the center tap 168 of the winding 170 while the switch positions 1 and 3 are coupled together through a small resistor 184 to the center tap 174 of the winding 176.

A pair of switching transistors 186, 188 have their emitter, or input, electrodes coupled together to the circuit node 149 and their collector, or output, electrodes coupled respectively to opposite terminals of the winding 170. The base, or control, electrode of the transistor 186 is coupled through a resistor 192 to one terminal of the base drive winding 176 which has the winding polarity opposite to that of the terminal of the primary winding 170 to which the collector electrode of the transistor 186 is connected. The base electrode of the switching transistor 188 is connected through a resistor 194 to the opposite terminal of the base drive winding 176.

A control transistor 196 is connected between the circuit node 190 and the center tap 174 of the base drive winding 176. The control transistor 196 may be bypassed by a resistor 198 to sustain an idling operation when zero load current is being drawn. An isolating diode 200 may be interposed between the collector, output, electrode of the control transistor 196 and the center tap 174 to isolate the emitters of the switching transistors from any starting voltage applied to the center tap of the base drive winding 176 from the output bus 124 of the power supply.

A multi-stage voltage doubler network 202 is shown coupled across the output terminals 204, 206 of the output winding 208 of the switching transformer 172. The voltage doubler network 202 consists in this example of five cascaded voltage doubler stages, which together multiply the voltage ten times from input to output, thusly with a turns ratio of approximately 1 to 30 between the primary winding 170 and the secondary winding 208. A voltage of approximately 10 volts on the primary winding may be rectified, multiplied and filtered, to provide approximately 3,000 volts at the output terminal 210 of the voltage doubler network. With a turns ratio of approximately 30 and a five-stage voltage doubler network, a highly efficient optimum is achieved between leakage currents and other losses in the voltage doubler network components and the $CV^2f$ losses in the secondary winding 208. Relatively high quality capacitors 212 and diodes 214 may be selected for even greater efficiency. The voltage doubler network operates on a charge transfer principle and is explained in Butterworth's publication of "High Voltage Laboratory Technique," by Craggs and Meek. The voltage rating of the capacitors 212 need only be twice the peak output voltage of the winding 208.

Connected in series between terminal 206 of the output winding 208 and the circuit node 149 is shown a control signal generating network 216 which consists in this example of a voltage dropping resistor 218 and integrating capacitor 220 and two rectifier diodes 222, the latter being connected in a series across the terminals of the capacitor 220 which is connected in parallel with the resistor 218.

The signal developed across the resistor 218 is proportional to the magnitude of current drawn thorugh the voltage doubler network 202 and is coupled through a control lead 24 to the control electrode of the control transistor 196. A variable resistor or potentiometer 226 may be interposed in the lead 24, to provide adjustment in the magnitude of cut-off current, drawn by the load, which causes the converter to stop oscillating. This adjustment is provided so that when an overload occurs, the supply is effectively turned off to protect the components and preclude useless battery drain.

The output lead 210 of the voltage doubler network 202 is coupled through a radio frequency filtering network which consists of a radio frequency choke 228, and a series resistor 230. A surge limiting resistor 232 may be interconnected between the choke 228 and the network 202 to protect the diodes 214 in the event of a current surge occurring on the output side of the resistor 232. The surge limiting resistor also aids in the radio frequency filtering. A pair of filter capacitors 234, 236 are shown coupled between the opposite terminals of the radio frequency choke 228 and the circuit node 149. A high voltage output jack 238 is connected to the filter resistor 230.

A 3-wafer metering switch 240 may be utilized to connect a meter 242 between various circuit points to measure three different operating parameters associated with the function of the automatic power supply. The switch contacts 2 and 3 of the first switch wafer 244 of the switch 240 are connected together and to the circuit node 190. The movable contact of the first wafer 244 is shown connected to ground. The switch position 1 of the second wafer 246 of the switch 240 is connected through a variable resistor 248 to the circuit node 149. The switch contact 2 of the wafer 246 is connected through a dropping resistor 250 to the negative terminal of the battery 154 while the third switch contact is connected to ground. The movable contact of the wafer 246 is connected to the negative terminal of the meter 242.

The first switch position of the third switch wafer 252 is connected through a resistor 254 to ground. The second switch contact of the wafer 252 is connected to the output bus 124 of the power supply while the third switch contact of the wafer 252 is connected through a high voltage switch 256 and a meter multiplier switch 258 to the high voltage output terminal 238. The high voltage switch 256 is mechanically connected to the switch 240 and its contacts are closed only when the movable contacts of the selector switch 240 are in their third position. The movable contact of the switch wafer 252 is connected to the positive terminal of the meter 242. A meter protecting capacitor 260 is connected across the terminals of the meter 242.

A silicon diode 262 and a capacitor 264 are connected between the circuit node 149 and ground so that when the meter selector switch 240 is switched to indicate the current flowing through the resistor 218 or the voltage coupler network output lead 210, the diode is placed in shunt with the meter causing the meter to read logarithmically. This enables the operator to read ion vacuum pump pressure directly when such is connected to the output terminal 238 without having to switch meter scales or use a current versus pressure calibration curve. In addition, the critical part of the meter scale is expanded thereby to give good resolution where needed.

It may be noted that no current drain is required by the meter multiplier resistor 258 except when it is desired to measure the high voltage output. This results in added efficiency. A switch 266 which is mechanically connected to the selector switch 108 automatically bleeds the high voltage from the high voltage terminal 238 through a bleeder resistor 268 when the movable contacts of the switch 108 are in the number 2 or OFF position.

In operation, when the function selector switch 108 is in its number 1 position, the system is line energized only; and the battery 154 cannot be connected to the output bus 124 by the operation of the holding relay 112 because the switch contacts 3 and 4 of the wafer 152 are not in contact with their respective movable contact. Any current flowing out of the battery must, in this state, pass through both resistors 162 and 158 in series. During this mode of operation, the battery is undergoing "full charge" because the full charging current limiting resistor 162 is utilized to couple the battery to the charging diode 160.

When the function selector switch 108 is in its number 2 position, the power supply and battery are "off" and no current can be drawn from either one except for purposes of metering the potential of the battery 154. In this position the switch 266 is closed to bleed off any dangerously high voltage from the terminal 238.

When the switch is in its number 3 position, the system is line operated and will automatically switch to battery operation whenever the line voltage fails or is otherwise removed. The switchover to battery operation or vice versa is accomplished by the relay 112 and its contact points 150, 156 which selectively connect either the emitter of the transistor 136 or the negative terminal of the battery 154 to the ground bus. In addition the trickle charging rate resistor 158 is continuously in the circuit to connect the negative terminal of the battery 154 to the charging diode 160.

When the selector switch 108 is placed in position 4, the system is adapted to battery operation only, irrespective of the state of the relay 112 or its contacts 150, 156.

When the movable contact 182 of the wafer 180 of the selector switch 108 is moved from position 1 or 3 to either of positions 2 or 4, a momentary starting signal is applied through the resistor 184, bypassing the larger resistor 178, to the center tap 174 of the base drive winding 176.

A second, line operated relay solenoid 270 may be connected across the power supply line input by the operation of a series standby switch having a first set of contact points 272 and a gauged second set of contact points 274. When the standby switch is in position 1, the solenoid 270 is not energized, the contact points 274 couple output line operated power supply to the contact points of the relay 112, and the relay points 276 couple the high voltage output of the voltage doubler network 202 to output terminal 238.

When, however, it is desired to utilize the disclosed system as an instantly available standby unit for another line operated power supply, the standby switch is placed in its position 2, the solenoid 270 is energized from the line and the relay points 276 are held to connect the high voltage output terminal 238 to another line operated high voltage source 278. In addition, the switch contact points 274 disconnect the output of the disclosed line operated power supply from the converter. In this condition, it may be noted, the battery 154 may continue to be recharged.

If the line voltage fails, or is deliberately removed, the solenoid 270 releases the relay contacts 276 so as immediately to connect the high voltage terminal 238 to the voltage doubler network output.

For the purposes of metering or observing different operational parameters of the system, the meter selector switch 240 is utilized to couple the meter movement 242 to different points in the system. In position number 1 of the metering switch, the meter is coupled in series with the load so as to measure the current being drawn by the ion vacuum pump which is a logarithmic function of the pressure in the vacuum pump. The silicon diode 264 shunted across the meter, in this position of the selector switch, causes the meter to indicate directly the desired logarithmic response and also desirably expands the dynamic range of the meter.

In the meter selector switch position 2 the voltage of the battery 154 is measured directly.

When the meter switch is in position 3, the meter multiplier resistor 258 is placed in series with the meter by the operation of the high voltage switch 256, which is closed in that portion, and the magnitude of the voltage at the high voltage terminal 238 may be indicated by the meter.

There has thus been disclosed a highly efficient and versatile transistor converter power supply system which exhibits the advantages and achieves the objects set forth above.

What is claimed is:
1. An automatic line and battery operated power supply network comprising: a line alternating current energized regulated power supply for providing a low value of direct current output voltage and having a power supply output terminal; a rechargeable battery having an output terminal; a converter input terminal; means responsive to the existence of said line alternating current for automatically connecting said input terminal selectively to one of said power supply and battery output terminals; means coupled to said power supply for charging said battery when said converter input terminal is connected to said power supply output terminal; a converter transistor network including a square hysteresis loop core transformer having a center tapped primary winding and a center tapped base drive winding and an output winding, each said winding having first and second terminals; first and second switching transistors having their collector electrodes respectively coupled to said first and second terminals of said primary winding and having their emitter electrodes coupled to a ground bus and having their control electrodes coupled respectively to said first and second terminals of said base drive winding; a control gate transistor coupled between the center tap of said base drive winding and said ground bus; means for coupling said converter input terminal to said center tapped primary winding; means for coupling time selectively at least a portion of the magnitude of voltage signal at said input terminal to said center tap of said base drive winding; a multiple stage voltage doubler network having an output terminal and being coupled between said first and second terminals of said output winding; control signal generating means coupled between said second terminal of said output winding and said ground bus for providing a control signal the magnitude of which is representative of the magnitude of current flowing between said ground bus and said output terminal of said doubler network; and coupling means for impressing at least a portion of said control signal upon the control electrode of said control gate transistor.

2. An automatic line and battery operated power supply and battery charging apparatus comprising: a line alternating current energized regulated power supply for providing a low voltage direct current output voltage and having a power supply output terminal; a rechargeable battery having an output terminal; a converter input terminal; means, responsive to the existence of said line alternating current for automatically connecting said input terminal to one selectively of said power supply and battery output terminals; a converter transistor network including a square hysteresis loop transformer having a center tapped primary winding and a center tapped drive winding and an output winding; a pair of switching transistors having their output electrodes coupled to the terminals of said primary winding and having their input electrodes coupled to a circuit node and having their control electrodes coupled to the terminals of said drive winding; a control gate transistor coupled between the center tap of said drive winding and said circuit node; means for coupling said converter input terminal to said center tap of said primary winding; a multiple stage voltage doubler network having an output terminal and being coupled to the terminals of said output winding; control signal generating means coupled between a terminal of said output winding and said circuit node for providing a control signal the magnitude of which is a measure of the magnitude of current flowing between said circuit node and said output terminal of said doubler network; coupling means for impressing at least a portion of said control signal upon the control electrode of said control gate transistor; and a meter network including an electric meter movement, and meter switching means for selectively connecting said movement to at least one of said battery, output terminal, doubler network, and said circuit node.

3. An automatic line and battery operated power supply and battery charging apparatus comprising: a line alternating current energized regulated power supply for providing a low voltage direct current output voltage and having a power supply output terminal; a rechargeable battery having an output terminal; a converter input terminal; means, responsive to the existence of said line alternating current for automatically connecting said input terminal to one selectively of said power supply and battery output terminals; means coupled to said power supply for charging said battery; a converter transistor network including a saturable core transformer having a center tapped primary winding and a center tapped base drive winding and an output winding; a pair of switching transistors having their collector electrodes respectively coupled to the terminals of said primary winding and having their emitter electrodes coupled to a circuit node and having their control electrodes coupled respectively to the terminals of said base drive winding; a control gate transistor coupled between the center tap of said base drive winding and said circuit node; means for coupling said converter input terminal to said center tap of said primary winding; means for time selectively coupling at least a portion of the magnitude of the voltage signal at said input terminal to said center tap of said base drive winding; unidirectional current flow means interposed between the latter said center tap and said control gate transistor for isolating said signal from said gate transistor; a multiple stage voltage doubler network having an output terminal and being coupled between said first and second terminals of said output winding; control signal generating means coupled between said output winding and said circuit node for providing a control signal the magnitude of which is a measure of the magnitude of current flowing between said circuit node and said output terminal of said doubler network; and coupling means for impressing at least a portion of said control signal upon the control electrode of said control gate transistor.

4. An automatic line and battery operated power supply and battery charging apparatus comprising: a line alternating current energized regulated power supply for providing a low voltage direct current output voltage and having a power supply output terminal; a rechargeable battery having an output terminal; a converter input terminal; means, responsive to the existence of said line alternating current for automatically connecting said input terminal to one selectively of said power supply and battery output terminals; means coupled to said power supply for charging said battery when said converter input terminal is connected to said power supply output terminal; a converter transistor network including a square hysteresis loop saturable core transformer having a center tapped primary winding and a center tapped base drive winding and an output winding, each having first and second terminals; first and second switching transistors having their collector electrodes respectively coupled to said first and second terminals of said primary winding and having their emitter electrodes coupled to a circuit node and having their control electrodes coupled respectively to said first and second terminals of said base drive winding; a resistively by-passed control gate transistor coupled between the center tap of said base drive winding and said circuit node; means for coupling said converter input terminal to said center tap of said primary winding; means for coupling at least a portion of the magnitude of the voltage signal at said input terminal to said center tap of said base drive winding; unidirectional current flow means interposed between the latter said center tap and said control gate transistor for isolating said signal from said gate transistor; a multiple stage voltage doubler network having an output terminal and being coupled between said first and second terminals of said output winding; radio frequency isolating means intercoupled between said doubler network and the latter said output terminal; control signal generating means coupled between said second terminal of said output winding and said circuit node for providing a control signal the magnitude of which is a measure of the magnitude of current flowing between said circuit node and said output terminal of said doubler network; coupling means for impressing at least a portion of said control signal upon the control electrode of said control gate transistor; and a meter network including an electric meter movement, a logarithmic scale shunting diode coupled between said circuit node and a ground terminal, and meter switching means for selectively connecting said movement to said battery, to said output terminal, to said doubler network, and between said circuit node and a ground terminal.

5. An automatic line and battery operated power supply and battery charging apparatus comprising: a line alternating current energized regulated power supply for providing a low voltage direct current output voltage and having a power supply output terminal; a rechargeable battery having an output terminal; a converter input terminal; means, responsive to the existence of said line alternating current for automatically connecting said input terminal to one selectively of said power supply and battery output terminals; means coupled to said power supply for charging said battery when said converter input terminal is connected to said power supply output terminal; a converter transistor network including a square hysteresis loop saturable core transformer having a center tapped primary winding and a center tapped base drive winding and an output winding, each having first and second terminals; first and second switching transistors having their collector electrodes respectively coupled to said first and second terminals of said primary winding and having their emitter electrodes coupled to a circuit node and having their control electrodes coupled respectively to said first and second terminals of said base drive winding; a control gate transistor coupled between the center tap of said base drive winding and said circuit node; means for coupling said converter input terminal to said center tap of said primary winding; means for time selectively coupling at least a portion of the magnitude of the voltage signal at said input terminal to said center tap of said base drive winding; a multiple stage voltage doubler network having an output terminal and being coupled between said first and second terminals of said output winding; control signal generating means coupled between said second terminal of said output winding and said circuit node for providing a control signal the magnitude of which is a measure of the magnitude of current flowing between said circuit node and said output terminal of said doubler network; and coupling means for impressing at least a portion of said control signal upon the control electrode of said control gate transistor.

References Cited by the Examiner
UNITED STATES PATENTS

| | | | |
|---|---|---|---|
| 2,263,320 | 11/1941 | Trucksess | 307—64 |
| 2,950,446 | 8/1960 | Humez et al. | |
| 2,967,989 | 1/1961 | Eno et al. | 321—15 X |
| 3,012,181 | 12/1961 | Schultz. | |
| 3,117,270 | 1/1964 | Tailleur | 331—113.1 X |
| 3,151,287 | 9/1964 | Pintell | 321—45 |

JOHN F. COUCH, *Primary Examiner.*

W. M. SHOOP, *Assistant Examiner.*